(12) United States Patent
Auffermann et al.

(10) Patent No.: US 8,658,069 B2
(45) Date of Patent: Feb. 25, 2014

(54) METHOD FOR PRODUCING SHRINK FILMS

(75) Inventors: Jörg Auffermann, Freinsheim (DE); Gabriel Skupin, Speyer (DE); Andreas Künkel, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/508,658

(22) PCT Filed: Nov. 2, 2010

(86) PCT No.: PCT/EP2010/066580
§ 371 (c)(1),
(2), (4) Date: May 8, 2012

(87) PCT Pub. No.: WO2011/054786
PCT Pub. Date: May 12, 2011

(65) Prior Publication Data
US 2012/0232191 A1    Sep. 13, 2012

(30) Foreign Application Priority Data

Nov. 9, 2009  (EP) ..................................... 09175416

(51) Int. Cl.
*B29C 47/06*    (2006.01)

(52) U.S. Cl.
USPC ............ 264/177.2; 428/480; 524/14; 524/47; 524/425; 524/447; 524/449; 524/451; 524/456

(58) Field of Classification Search
USPC ............ 524/14, 47, 425, 447, 449, 451, 456; 264/177.2; 428/480
See application file for complete search history.

(56) References Cited

U.S. PATENT DOCUMENTS

| 2011/0178196 | A1 | 7/2011 | Steinke et al. |
| 2011/0187029 | A1 | 8/2011 | Dietrich et al. |
| 2011/0237750 | A1* | 9/2011 | Ren et al. .................... 525/173 |
| 2012/0107527 | A1 | 5/2012 | Auffermann |

FOREIGN PATENT DOCUMENTS

| DE | 102005053068 A1 | 5/2007 |
| EP | 0 569 146 A * | 4/1993 |
| WO | WO-02059198 A1 | 8/2002 |
| WO | WO-03/061957 A2 | 7/2003 |
| WO | WO-2010/012695 A1 | 2/2010 |
| WO | WO-2010034689 A1 | 4/2010 |
| WO | WO-2011/054786 A1 | 5/2011 |

OTHER PUBLICATIONS

International Preliminary Report on Patentability for PCT/EP2010/066580 dated Nov. 2, 2010.
International Search Report for PCT/EP2010/066580 mailed Feb. 28, 2011.
International Preliminary Report on Patentability for PCT/EP2010/066580 mailed Dec. 23, 2011.
Translation of DE102005053068A1 (filed May 8, 2012).
Translation of International Preliminary Report on Patentability of PCT/EP2010/066580.

* cited by examiner

*Primary Examiner* — Peter Szekely
(74) *Attorney, Agent, or Firm* — Novak Druce Connolly Bove + Quigg LLP

(57) ABSTRACT

The present invention relates to a process for producing shrink films comprising:

A) from 20 to 90% by weight of a biodegradable, aliphatic-aromatic polyester and B) from 10 to 80% by weight of one or more polymers selected from the group consisting of: polylactic acid, polypropylene carbonate, polycaprolactone, polyhydroxyalkanoate, chitosan, gluten, and one or more aliphatic/aromatic polyesters, such as polybutylene succinate, polybutylene succinate adipate, or polybutylene succinate sebacate, or polybutylene terephthalate-co-adipate; and C) from 0 to 2% by weight of a compatibilizer, where a blow-up ratio smaller than or equal to 4:1 is selected.

11 Claims, No Drawings

METHOD FOR PRODUCING SHRINK FILMS

CROSS-REFERENCE TO RELATED APPLICATIONS

This application is a national stage application (under 35 U.S.C. §371) of PCT/EP2010/066580, filed Nov. 2, 2010, which claims benefit of European Application 09175416.8, filed Nov. 9, 2009.

The present invention relates to a process for producing shrink films comprising:

A) from 20 to 90% by weight of a biodegradable, aliphatic-aromatic polyester obtainable via condensation of:
   i) from 40 to 70 mol %, based on components i to ii, of one or more dicarboxylic acid derivatives or dicarboxylic acids selected from the group consisting of: succinic acid, adipic acid, sebacic acid, azelaic acid, and brassylic acid;
   ii) from 60 to 30 mol %, based on components i to ii, of a terephthalic acid derivative;
   iii) from 98 to 102 mol %, based on components i to ii, of a $C_2$-$C_8$ alkylenediol or $C_2$-$C_6$ oxyalkylenediol;
   iv) from 0.00 to 2% by weight, based on the total weight of components i to iii, of a chain extender and/or crosslinking agent selected from the group consisting of: a di- or polyfunctional isocyanate, isocyanurate, oxazoline, epoxide, and carboxylic anhydride, and/or an at least trihydric alcohol, or an at least tribasic carboxylic acid;
   v) from 0.00 to 50% by weight, based on the total weight of components i to iv, of an organic filler selected from the group consisting of: native or plastified starch, natural fibers, and wood flour, and/or an inorganic filler selected from the group consisting of: chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, glass fibers, and mineral fibers, and
   vi) from 0.00 to 2% by weight, based on the total weight of components i to iv, of at least one stabilizer, nucleating agent, lubricant and release agent, surfactant, wax, antistatic agent, antifogging agent, dye, pigment, UV absorber, UV stabilizer, or other plastics additive;
   and B) from 10 to 80% by weight of one or more polymers selected from the group consisting of: polylactic acid, polyalkylene carbonate, polycaprolactone, polyhydroxyalkanoate, chitosan, gluten, and one or more aliphatic polyesters, such as polybutylene succinate, polybutylene adipate, polybutylene sebacate, polybutylene succinate adipate, or polybutylene succinate sebacate; and C) from 0 to 2% by weight of a compatibilizer, where a blow-up ratio smaller than or equal to 4:1 is selected.

Shrink films are nowadays used for a very wide variety of packaging applications. A distinction is made between what are known as heavy-gauge shrink films, which are mainly used for securing products stacked on pallets, e.g. in the plastics industry (bagged products) or in the construction industry (bricks, stone, construction materials, etc.), and fine-gauge shrink films which are used, for example, for packs (e.g. six-packs of 0.5 l, 1 l or 1.5 l PET bottles) in the drinks industry. Most of the shrink films used in the prior art comprise polyolefins, such as LDPE. The disadvantage of PE-based shrink films is that they have to be relatively thick in order to exert the necessary retaining forces on the packed products. The thickness of fine-gauge PE shrink films is usually about 30 to 90 µm, whereas the thicknesses of heavy-gauge PE shrink films are generally from 130 to 200 µm. This implies high materials costs for the packaging of products of this type. The relatively high weight also increases the costs of transport for the packed products. Finally, PE shrink films require temperatures of about 180° C. and higher for processing in what are known as shrink wrappers. The high processing temperatures lead to high energy costs and can also have adverse consequences for the products to be packed.

It was therefore an object of the present invention to provide thin shrink films which, when compared with the relatively thick PE films, exhibit good shrink properties together with high retention forces on the packed products. A further intention was to lower the processing temperature in the shrink wrappers.

Surprisingly, the process mentioned in the introduction provides thin shrink films with excellent shrink properties.

Longitudinal and transverse shrink properties of shrink films are important, alongside mechanical strength, for the level of retention forces subsequently exerted on the packed products. The shrinkage values for fine-gauge shrink films are preferably greater than 60% longitudinally, in particular from 70 to 80%, and smaller than 40% transversely, in particular from 20 to 30%. These shrink properties are determined to a considerable extent via the orientation introduced into, and frozen into, the material during extrusion of the film. In the case of the fine-gauge polyolefin-based shrink films, for example made of LDPE, it is found that a film that has been preferentially oriented longitudinally also has a higher level of shrink properties in that direction. Conversely, films that have been strongly oriented transversely also have relatively high shrinkage values in that direction. The value known as blow-up ratio (BUR) is probably the most important parameter that affects shrink properties during extrusion of the film. When the melt is discharged from the annular blown-film die, the film bubble is drawn out with continuous widening until the final bubble diameter, and the desired thickness of the film, is reached, and is subjected to intensive cooling by means of a cooling ring. Said widening is achieved by using air, which is introduced into the interior of the film bubble by way of air ducts located within the die. At the same time, the thickness of the film is adjusted by way of the take-off speed. On achievement of the desired dimensions of the film, the air supply is stopped or kept at the same level. The volume of air enclosed within the interior of the resultant film bubble determines the final diameter of the bubble. The ratio of this diameter of the bubble of the solidified film to the diameter of the blown-film die is termed the blow-up ratio (BUR). If a small blow-up ratio is selected, for example 2, the film is subjected to stronger longitudinal orientation, giving better shrink properties in that direction. In the case of large blow-up ratios, for example 4, greater transverse orientation is achieved, and this gives higher shrinkage values in that direction, for the same thickness of the film.

The properties of fine-gauge shrink films are subjected to closer investigation below, taking the example of packs used in the drinks industry. These results are substantially also valid for heavy-gauge shrink films.

The polymer mixtures mentioned in the introduction, composed of an aliphatic/aromatic (semiaromatic) polyester A and of a blend partner B, such as polylactic acid in particular, have particularly good suitability for the production of shrink films. The expression "semiaromatic polyesters based on aliphatic diols and on aliphatic/aromatic dicarboxylic acids"

also covers polyester derivatives, such as polyetheresters, polyesteramides, or polyetheresteramides. Among the suitable semiaromatic polyesters are linear non-chain-extended polyesters (WO 92/09654). Particularly suitable blend partners are aliphatic/aromatic polyesters derived from butanediol, terephthalic acid, and aliphatic $C_6$-$C_{18}$ dicarboxylic acids, such as adipic acid, suberic acid, azelaic acid, sebacic acid, and brassylic acid (for example as described in WO 2006/097353 to 56). Preference is given to chain-extended and/or branched semiaromatic polyesters. The latter are known from the specifications WO 96/15173 to 15176, 21689 to 21692, 25446, 25448, or WO 98/12242, cited in the introduction, and express reference is made to these. It is also possible to use a mixture of various semiaromatic polyesters.

As mentioned in the introduction, suitable materials for the process of the invention for producing shrink films are biodegradable, aliphatic-aromatic polyesters A which comprise:

i) from 40 to 70 mol %, based on components i to ii, of one or more dicarboxylic acid derivatives or dicarboxylic acids selected from the group consisting of: succinic acid, adipic acid, sebacic acid, azelaic acid, and brassylic acid;

ii) from 60 to 30 mol %, based on components i to ii, of a terephthalic acid derivative;

iii) from 98 to 102 mol %, based on components i to ii, of a $C_2$-$C_8$ alkylenediol or $C_2$-$C_6$ oxyalkylenediol;

iv) from 0.00 to 2% by weight, based on the total weight of components i to iii, of a chain extender and/or crosslinking agent selected from the group consisting of: a di- or polyfunctional isocyanate, isocyanurate, oxazoline, epoxide, and carboxylic anhydride, and/or an at least trihydric alcohol, or an at least tribasic carboxylic acid;

v) from 0.00 to 50% by weight, based on the total weight of components i to iv, of an organic filler selected from the group consisting of: native or plastified starch, natural fibers, and wood flour, and/or an inorganic filler selected from the group consisting of: chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, glass fibers, and mineral fibers, and vi) from 0.00 to 2% by weight, based on the total weight of components i to iv, of at least one stabilizer, nucleating agent, lubricant and release agent, surfactant, wax, antistatic agent, antifogging agent, dye, pigment, UV absorber, UV stabilizer, or other plastics additive.

Aliphatic-aromatic polyesters A used with preference comprise:

i) from 52 to 65 mol %, and in particular 58 mol %, based on components i to ii, of one or more dicarboxylic acid derivatives or dicarboxylic acids selected from the group consisting of: succinic acid, azelaic acid, brassylic acid, and preferably adipic acid, with particular preference sebacic acid;

ii) from 48 to 35 mol %, and in particular 42 mol %, based on components i to ii, of a terephthalic acid derivative;

iii) from 98 to 102 mol %, based on components i to ii, of 1,4-butanediol, and iv) from 0 to 2% by weight, preferably from 0.01 to 2% by weight, based on the total weight of components i to iii, of a chain extender and/or crosslinking agent selected from the group consisting of: a polyfunctional isocyanate, isocyanurate, oxazoline, carboxylic anhydride, such as maleic anhydride, and epoxide (in particular an epoxy-containing poly(meth)acrylate), and/or an at least trihydric alcohol, or an at least tribasic carboxylic acid.

Particularly suitable materials for producing shrink films are aliphatic-aromatic polyesters having a high proportion of aliphatic dicarboxylic acid of from 52 to 65 mol % and with particular preference from 52 to 58 mol %. As the proportion of the aliphatic dicarboxylic acid increases in the aliphatic-aromatic polyesters, it is possible to realize thinner layers.

Preferably suitable aliphatic dicarboxylic acids are adipic acid and in particular sebacic acid. An advantage of polyesters containing sebacic acid is that they are also available as renewable raw material and can be drawn to give relatively thin films.

The polyesters A described are synthesized by the processes described in WO-A 92/09654, WO-A 96/15173, or preferably WO-A 09/127555 and WO-A 09/127556, preferably in a two-stage reaction cascade. The dicarboxylic acid derivatives are first reacted together with the diol in the presence of a transesterification catalyst, to give a prepolyester. The intrinsic viscosity (IV) of this prepolyester is generally from 50 to 100 mL/g, preferably from 60 to 80 mL/g. Catalysts used are usually zinc catalysts, aluminum catalysts, and in particular titanium catalysts. An advantage of titanium catalysts, such as tetra(isopropyl) orthotitanate and in particular tetrabutyl orthotitanate (TBOT), over the tin catalysts, antimony catalysts, cobalt catalysts, and lead catalysts often used in the literature, e.g. tin dioctanate, is that when residual amounts of the catalyst or a product formed from the catalyst are retained in the product they are less toxic. This is particularly important in the case of biodegradable polyesters, since they can pass directly into the environment by way of the composting process.

The polyesters A are then produced in a second step by the processes described in WO-A 96/15173 and EP-A 488 617. The prepolyester is reacted with chain extenders ivb), for example with diisocyanates or with epoxide-containing polymethacrylates, in a chain-extending reaction that gives a polyester with IV of from 50 to 450 mL/g, preferably from 80 to 250 mL/g.

The process generally uses from 0.01 to 2% by weight, preferably from 0.1 to 1.0% by weight, and with particular preference from 0.1 to 0.3% by weight, based on the total weight of components i to iii, of a crosslinking agent (iva) and/or chain extender (ivb) selected from the group consisting of: a polyfunctional isocyanate, isocyanurate, oxazoline, epoxide, carboxylic anhydride, an at least trihydric alcohol, or an at least tribasic carboxylic acid. Chain extenders ivb that can be used are polyfunctional, and in particular difunctional, isocyanates, isocyanurates, oxazolines, carboxylic anhydride, or epixides.

Chain extenders, and also alcohols or carboxylic acid derivatives having at least three functional groups, can also be interpreted as crosslinking agents. Particularly preferred compounds have from 3 to 6 functional groups. Examples that may be mentioned are: tartaric acid, citric acid, malic acid; trimethylolpropane, trimethylolethane; pentaerythritol; polyethertriols and glycerol, trimesic acid, trimellitic acid, trimellitic anhydride, pyromellitic acid, and pyromellitic dianhydride. Preference is given to polyols, such as trimethylolpropane, pentaerythritol, and in particular glycerol. By using components iv it is possible to construct biodegradable polyesters which are pseudo plastic. The rheological behavior of the melts improves; the biodegradable polyesters are easier to process, for example easier to draw to give films in a melt-solidification process. The compounds iv act to reduce viscosity under shear, i.e. viscosity at relatively high shear rates is reduced.

A more detailed description is given below of examples of chain extenders.

The term "epoxides" in particular means a copolymer which is based on styrene, acrylate, and/or methacrylate, and which contains epoxy groups. The units bearing epoxy groups are preferably glycidyl (meth)acrylates. Copolymers that have proven advantageous have a proportion of glycidyl methacrylate greater than 20% by weight, particularly preferably greater than 30% by weight, and with particular preference greater than 50% by weight, based on the copolymer. The epoxide equivalent weight (EEW) in these polymers is preferably from 150 to 3000 g/equivalent and with particular preference from 200 to 500 g/equivalent. The average molecular weight (weight average) $M_W$ of the polymers is preferably from 2000 to 25 000, in particular from 3000 to 8000. The average molecular weight (number average) $M_n$ of the polymers is preferably from 400 to 6000, in particular from 1000 to 4000. Polydispersity (Q) is generally from 1.5 to 5. Copolymers of the abovementioned type containing epoxy groups are marketed by way of example by BASF Resins B.V. as Joncryl® ADR. Joncryl® ADR 4368 is particularly suitable as chain extender.

It is generally advisable to add the crosslinking (at least trifunctional) compounds to the polymerization reaction at a relatively early juncture.

The following compounds are suitable as bifunctional chain extenders:

an aromatic diisocyanate ivb is especially toluylene 2,4-diisocyanate, toluylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate or xylylene diisocyanate. Among these, particular preference is given to diphenylmethane 2,2'-, 2,4'-, and 4,4'-diisocyanate. The latter diisocyanates are generally used in the form of a mixture. The diisocyanates can also comprise subordinate amounts, e.g. up to 5% by weight, based on total weight, of uretdione groups, for example for capping of the isocyanate groups.

For the purposes of the present invention, an aliphatic diisocyanate is especially linear or branched alkylene diisocyanates or cycloalkylene diisocyanates having from 2 to 20 carbon atoms, preferably from 3 to 12 carbon atoms, e.g. hexamethylene 1,6-diisocyanate, isophorone diisocyanate, or methylenebis(4-isocyanatocyclohexane). Particularly preferred aliphatic diisocyanates are isophorone diisocyanate and in particular hexamethylene 1,6-diisocyanate.

Among the preferred isocyanurates are the aliphatic isocyanurates that derive from alkylene diisocyanates or from cycloalkylene diisocyanates, where these have from 2 to 20 carbon atoms, preferably from 3 to 12 carbon atoms, examples being isophorone diisocyanate or methylenebis(4-isocyanatocyclohexane). These alkylene diisocyanates can be either linear or branched compounds. Particular preference is given to isocyanurates based on n-hexamethylene diisocyanate, for example cyclic trimers, pentamers, or higher oligomers of hexamethylene 1,6-diisocyanate.

2,2'-Bisoxazolines are generally obtainable via the process of Angew. Chem. Int. Ed., vol. 11 (1972), pp. 287-288. Particularly preferred bisoxazolines are those in which $R^1$ is a single bond, a $(CH_2)_z$-alkylene group, where z=2,3 or 4, e.g. methylene, ethane-1,2-diyl, propane-1,3-diyl, propane-1,2-diyl, or a phenylene group. Particularly preferred bisoxazolines that may be mentioned are 2,2'-bis(2-oxazoline), bis(2-oxazolinyl)methane, 1,2-bis(2-oxazolinyl)ethane, 1,3-bis(2-oxazolinyl)propane or 1,4-bis(2-oxazolinyl)butane, in particular 1,4-bis(2-oxazolinyl)benzene, 1,2-bis(2-oxazolinyl)benzene or 1,3-bis(2-oxazolinyl)benzene.

The polyesters A generally have a number-average molar mass (Mn) in the range from 5000 to 100 000 g/mol, in particular in the range from 10 000 to 75 000 g/mol, preferably in the range from 15 000 to 38 000 g/mol, a weight-average molar mass (Mw) of from 30 000 to 300 000 g/mol, preferably from 60 000 to 200 000 g/mol, and a Mw/Mn ratio of from 1 to 6, preferably from 2 to 4. The intrinsic viscosity is from 50 to 450 g/mL, preferably from 80 to 250 g/mL (measured in o-dichlorobenzene/phenol; ratio by weight 50/50). The melting point is in the range from 85 to 150° C., preferably in the range from 95 to 140° C.

The amount used of aliphatic dicarboxylic acid i, based on the acid components i and ii, is from 40 to 70 mol %, preferably from 52 to 65 mol %, and with particular preference from 52 to 58 mol %. Sebacic acid, azelaic acid, and brassylic acid are obtainable from renewable raw materials, in particular from castor oil.

The amount used of terephthalic acid ii, based on the acid components i and ii, is from 60 to 30 mol %, preferably from 48 to 35 mol %, and with particular preference from 48 to 42 mol %.

Terephthalic and aliphatic dicarboxylic acid can be used either in the form of free acid or in the form of ester-forming derivatives. Particular ester-forming derivatives that may be mentioned are the di-$C_1$-$C_6$-alkyl esters, such as dimethyl, diethyl, di-n-propyl, di-isopropyl, di-n-butyl, diisobutyl, di-t-butyl, di-n-pentyl, diisopentyl, or di-n-hexyl ester. It is equally possible to use anhydrides of the dicarboxylic acids.

The dicarboxylic acids or ester-forming derivatives thereof can be used here individually or in the form of a mixture.

1,4-Butanediol is obtainable from renewable raw materials. WO-A 09/024294 discloses a biotechnological process for producing 1,4-butanediol, starting from various carbohydrates, using Pasteurellaceae microorganisms.

In the general method, the ratio set between the diol (component iii) and the acids (components i and ii) at the start of the polymerization reaction is from 1.0 to 2.5:1, preferably from 1.3 to 2.2:1. Excess amounts of diol are drawn off during the polymerization reaction, so that an approximately equimolar ratio is obtained at the end of the polymerization reaction. Approximately equimolar means that the diol/diacids ratio is from 0.98 to 1.02:1.

The polyesters mentioned may have any desired ratio between hydroxy end groups and carboxy end groups. The semiaromatic polyesters mentioned can also be end-group-modified. By way of example, therefore, OH end groups can be acid-modified via reaction with phthalic acid, phthalic anhydride, trimellithic acid, trimellithic anhydride, pyromellithic acid, or pyromellithic anhydride. Preference is given to polyesters having acid numbers smaller than 1.5 mg KOH/g.

In one preferred embodiment, from 1 to 80% by weight, based on the total weight of components i to iv, of an organic filler selected from the group consisting of: native or plastified starch, natural fibers, wood flour, and/or of an inorganic filler selected from the group consisting of: chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, glass fibers, and mineral fibers is added.

Starch and amylose can be native, i.e. not thermoplastified, or can have been thermoplastified using plasticizers such as glycerol or sorbitol (EP-A 539 541, EP-A 575 349, EP 652 910).

Examples of natural fibers are cellulose fibers, hemp fibers, sisal, kenaf, jute, flax, abacca, coconut fiber, or Cordenka fibers.

Preferred fibrous fillers that may be mentioned are glass fibers, carbon fibers, aramid fibers, potassium titanate fibers, and natural fibers, particular preference being given to glass fibers in the form of E glass. These can be used in the form of rovings or in particular in the form of chopped glass, in the forms commercially available. The diameter of these fibers is generally from 3 to 30 μm, preferably from 6 to 20 μm, and particularly preferably from 8 to 15 μm. The length of the fiber in the compounded material is generally from 20 μm to 1000 μm, preferably from 180 to 500 μm, and particularly preferably from 200 to 400 μm.

The biodegradable polyesters A can comprise further ingredients which are not essential to the invention and are known to the person skilled in the art. Examples are the additives conventional in plastics technology, e.g. stabilizers; nucleating agents; lubricants and release agents, such as stearates (in particular calcium stearate); plasticizers (plasticizers), such as citric esters (in particular tributyl acetylcitrate), glycerol esters, such as triacetylglycerol, or ethylene glycol derivatives, surfactants, such as polysorbates, palmitates, or laurates; waxes, such as beeswax or beeswax ester; antistatic agents, UV absorbers; UV stabilizers; antifogging agents, or dyes. The concentrations used of the additives are from 0 to 5% by weight, in particular from 0.1 to 2% by weight, based on the polyesters of the invention. The amounts comprised of plasticizers in the polyesters of the invention can be from 0.1 to 10% by weight.

The biodegradable polymer mixtures can be produced from the individual components (polyester A and polymer B) by known processes (EP 792 309 and U.S. Pat. No. 5,883, 199). By way of example, all of the blend partners can be mixed and reacted in one step of a process in mixing apparatuses known to the person skilled in the art, for example kneaders or extruders, at elevated temperatures, for example from 120° C. to 250° C.

Typical polymer mixtures comprise:
from 20 to 90% by weight, preferably from 45 to 70% by weight, of a polyester A, and
from 80 to 10% by weight, preferably from 55 to 30% by weight, of one or more polymers B selected from the group consisting of: polylactic acid (which is particularly preferred), polyethylene carbonate, polypropylene carbonate, polycaprolactone, polyhydroxyalkanoate, chitosan, and gluten, and one or more aliphatic polyesters, such as polybutylene succinate, polybutylene adipate, polybutylene sebacate, polybutylene succinate adipate, or polybutylene succinate sebacate; and
from 0 to 2% by weight of a compatibilizer C.

It is preferable that the polymer mixtures in turn comprise from 0.05 to 2% by weight of a compatibilizer C. Preferred compatibilizers are carboxylic anhydrides, such as maleic anhydride, and in particular the styrene-, acrylate-, and/or methacrylate-based copolymers described above that contain epoxy groups. The units bearing epoxy groups are preferably glycidyl (meth)acrylates. Copolymers of the abovementioned type containing epoxy groups are marketed by way of example by BASF Resins B.V. as Joncryl® ADR. By way of example, Joncryl® ADR 4368 is particularly suitable as compatibilizer.

An example of a suitable biodegradable polyester B is polylactic acid. It is preferable to use polylactic acid having the following property profile:
melt volume rate (MVR at 190° C. and 2.16 kg to ISO 1133) of from 0.5 to 15 ml/10 minutes, preferably from 1 to 9 ml/10 minutes, particularly preferably from 2 to 6 ml/10 minutes
melting point below 180° C.
glass transition temperature (Tg) above 55° C.
water contents smaller than 1000 ppm
residual monomer content (lactide) smaller than 0.3%
molecular weight greater than 50 000 daltons.

Examples of preferred polylactic acids from Nature-Works® are Ingeo® 2002 D, 4032 D, 8251 D, 3251 D, and in particular 4042 D, and 4043 D (polylactic acids from NatureWorks).

Polyhydroxyalkanoates are primarily poly-4-hydroxybutyrates and poly-3-hydroxybutyrates, and the term also comprises copolyesters of the abovementioned hydroxybutyrates with 3-hydroxyvalerates or 3-hydroxyhexanoate. Poly-3-hydroxybutyrate-co-4-hydroxybutyrate materials are in particular known from Telles.

They are marketed with trademark Mirel®. Poly-3-hydroxybutyrate-co-3-hydroxyhexanoate materials are known from P&G or Kaneka. Poly-3-hydroxybutyrates are marketed by way of example by PHB Industrial with trademark Biocycle®, and by Tianan as Enmat®.

The molecular weight Mw of the polyhydroxyalkanoates is generally from 100 000 to 1 000 000 and preferably from 300 000 to 600 000.

Polycaprolactone is marketed by Daicel as Placcel®.

Polyalkylene carbonate is in particular polyethylene carbonate and polypropylene carbonate. Polyethylene carbonate is a polymer produced from ethylene oxide and carbon dioxide. Polypropylene carbonate is a polymer produced from propylene oxide and carbon dioxide.

The polyesters and polymer mixtures mentioned in the introduction have high biodegradability together with good film properties.

For the purposes of the present invention, a substance or substance mixture complies with the "biodegradable" feature if said substance or substance mixture exhibits a percentage degree of biodegradation, as defined in DIN EN 13432, of at least 90%.

Biodegradation generally leads to decomposition of the polyesters or polyester mixtures in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungae, and algae. Biodegradability can be quantified by way of example by mixing polyester with compost and storing it for a particular period. By way of example, according to DIN EN 13432, $CO_2$-free air is passed through ripened compost during the composting process, and the compost is subjected to a defined temperature profile. The biodegradability here is defined as a percentage degree of biodegradation by taking the ratio of the net amount of $CO_2$ released from the specimen (after subtraction of the amount of $CO_2$ released by the compost without specimen) to the maximum amount of $CO_2$ that can be released from the specimen (calculated from the carbon content of the specimen). Biodegradable polyesters or biodegradable polyester mixtures generally exhibit marked signs of degradation after just a few days of composting, examples being fungal growth, cracking, and perforation.

Other methods for determining biodegradability are described by way of example in ASTM D5338 and ASTM D6400-4.

Successful embodiments of shrink films generally have a plurality of layers. Shrink films usually use from 2 to 7 layers, preferably from 2 to 3 layers. The reason for this is that no single film provides ideal compliance with all requirements.

By way of example, an exterior layer or outer layer generally has to be scratch resistant and have resistance to temperature change, and have low adhesion. Tendency toward adhesion has to be relatively low simply in order to avoid sticking of the film during the production process. It is preferably composed of a mixture of from 10 to 100% by weight of an aliphatic-aromatic polyester and from 90 to 0% by weight of polylactic acid, and from 0 to 10% by weight of a wax formulation using from 0 to 5% by weight of wax, from 0 to 10% by weight of dispersing agent (e.g. metal salts of stearic acid, oleic acid, ethylenebisstearylamide, amides (e.g. erucamide, oleamide)), and from 0 to 5% of antiblocking agent. An outer layer made of aliphatic-aromatic polyester has advantages in transparency and printability. This method can also provide shrink film embodiments which have specular gloss. Finally, aliphatic-aromatic polyesters, such as Ecoflex®, exhibit excellent seal seam strength, and shrink films using Ecoflex® as outer film therefore have excellent suitability for sealing.

The middle layer is generally stiffer and can also be termed backing layer. The middle layer preferably comprises from 30 to 80% by weight, particularly preferably from 30 to 55% by weight, of polylactic acid, and from 20 to 70% by weight, with particular preference from 45 to 70% by weight, of the aliphatic-aromatic polyester. The middle layer usually comprises from 40 to 70% of the thickness of the shrink film.

The inner layer is the layer in contact with the products to be packaged. It generally has to be soft and has to avoid adhering to the products. It is preferably composed of a mixture of from 10 to 100% by weight of an aliphatic-aromatic polyester and from 90 to 0% by weight of polylactic acid, and from 0 to 10% by weight of a wax formulation using from 0 to 5% by weight of wax, from 0 to 10% by weight of dispersing agent (e.g. metal salts of stearic acid, oleic acid, ethylenebisstearylamide, amides (e.g. erucamide, oleamide)), and from 0 to 5% of antiblocking agent. An internal layer particularly preferably comprises from 45 to 100% of an aliphatic-aromatic polyester and from 0 to 55% of polylactic acid. An internal layer made of aliphatic-aromatic polyesters has advantages in transparency and printability. This method can also provide shrink film embodiments which have specular gloss. Finally, aliphatic-aromatic polyesters, such as Ecoflex®, exhibit excellent seal seam strength, and shrink films using Ecoflex® as outer film therefore have excellent suitability for sealing.

Preference is given to the three-layer shrink film. The constitution of the film is preferably as follows:
i) exterior layers (outer layer and internal layer) comprising a mixture of from 10 to 100% by weight of an aliphatic-aromatic polyester and from 90 to 0% by weight of polylactic acid, and from 0 to 10% by weight of a wax formulation using wax, dispersing agent, and antiblocking agents;
ii) a middle layer comprising from 30 to 55% by weight of polylactic acid and from 45 to 70% by weight of the aliphatic-aromatic polyester.

Preference is likewise given to the two-layer shrink film. The constitution of the layer structure is preferably as follows:
i) an exterior layer comprising a mixture of from 10 to 100% by weight of an aliphatic-aromatic polyester and from 90 to 0% by weight of polylactic acid, and from 0 to 10% by weight of a wax formulation using wax, dispersing agent, and antiblocking agents;
ii) a middle layer comprising from 30 to 55% by weight of polylactic acid and from 45 to 70% by weight of the aliphatic-aromatic polyester.

Production of multilayer shrink films generally uses coextrusion processes.

A suitable lamination process for bonding two or more films to give a laminate is extrusion lamination using hot-melt adhesives or using dispersion adhesives, and this is likewise suitable for shrink films.

As mentioned, a distinction is made between heavy-gauge shrink films, mainly used for securing products stacked on pallets, e.g. in the plastics industry (bagged products), or in the construction industry (bricks, stone, construction materials, bundling, timber and panels, insulating materials), catalogues, coal/wood briquettes, cosmetics, coatings and containers, laminate and parquet flooring, mattresses, carpets, textiles, newspapers, etc., and fine-gauge shrink films used by way of example for packs (e.g. six-packs of 0.5 l, 1 l, or 1.5 l PET bottles) in the drinks industry (soft drinks, beer, mineral water, milk), or for canned foods or multipacks.

The thickness of the fine-gauge shrink films produced by the process of the invention is usually about 30 to 80 µm, whereas the thicknesses of heavy-gauge shrink films are generally from 100 to 180 µm, these generally being from 30 to 50% thinner than comparable shrink films made of LDPE, for identical shrinkage values.

For flexible, soft shrink films it is advisable to use polyester blends which have a coherent phase composed of an aliphatic-aromatic polyester A, while polyester blends with component B in the coherent phase are used for high-stiffness shrink films such as those in packaging for CDs, DVDs, books, games, etc.

Finally, shrink films made of PE can, as mentioned, be processed in what are known as shrink wrappers only at temperature of about 180° C. and above. The high processing temperatures lead to high energy costs and can also have adverse consequences for the products to be packaged. The shrink films produced by the process of the invention can generally be processed in shrink wrappers at temperatures that are lower by from 20 to 50° C., preferably at temperatures below 150° C.

Experimental System

1. Blown-Film Plant

The shrink films were produced on a state-of-the-art 3-layer-blown-film coextrusion plant designed for polyolefins. The blown-film plant had the following equipment:
Extruder: layer A: 65×30 L/D, layer B: 75×30 L/D, layer C: 65×30 L/D All 3 of the extruders had a standard barrier screw with crosshole mixing element and grooved feed zone, and also had a gravimetric metering unit for 3-4 components (batch mixer).

3-layer blowing head with di diameter 225 mm and die gap 1.5 mm
capacitive thickness measurement
thickness regulation by way of segmented cooling ring
double-lip cooling ring
internal and external cooling with cooled air
2 winding units.

2. Film Production

Since, as previously mentioned, blow-up ratio (BUR) is a significant parameter for influencing shrink properties, this was varied in the following stages during film production: 2:1, 3:1, and 4:1. All of the other machine settings were kept as constant as possible:
constant machine parameters:
temperatures in extruder 1 (layer A): 155-160° C.

temperatures in extruder 2 (layer B): 155-160° C.
temperatures in extruder 3 (layer A): 155-160° C.
temperatures of blowing head: 170° C.
melt temperature: from 170 to 180° C. (for all 3 extruders)
film thickness: 30 μm
total output: 190 kg/h
cooling-air temperature: 30° C.
thickness distribution: layer A: 20%/layer B: 60%/layer C: 20%

Variable machine parameters
blow-up ratio: 2:1 (corresponds to film width: 707 mm)
blow-up ratio: 3:1 (corresponds to film width: 1061 mm)
blow-up ratio: 4:1 (corresponds to film width: 1414 mm)
Starting materials
The polyesters and polyester mixtures used for producing the shrink films were as follows:

Polyester A1

The first reference material used was Ecoflex® F BX 7011 (a polybutylene terephthalate adipate from BASF SE, produced as follows: 87.3 kg of dimethyl terephthalate, 80.3 kg of adipic acid, 117 kg of 1,4-butanediol, and 0.2 kg of glycerol were mixed together with 0.028 kg of tetrabutyl orthotitanate (TBOT), the molar ratio of alcohol components and acid component being 1.30. The reaction mixture was heated to a temperature of 180° C. and reacted for 6 h at this temperature. The temperature was then increased to 240° C., and the excess dihydroxy compound was removed by distillation in vacuo over a period of 3 h. 0.9 kg of hexamethylene diisocyanate was then slowly metered into the mixture within a period of 1 h at 240° C. The resultant polyester A1 had a melting point of 119° C. and a molar mass ($M_n$) of 23 000 g/mol).

Polyester A1/Wax Blend

A blend of: 97% of A1+2% of antiblocking Ecoflex Masterbatch AB1 (polymer mixture made of 40% by weight of A1 and 60% by weight of calcium carbonate)+1% of slip Ecoflex Masterbatch SL1 (polymer mixture made of 90% by weight of A1 and 10% by weight of Erucamide).

Polyester A2

Polybutylene terephthalate sebacate, produced as follows: by analogy with polyester A1, the following starting materials were reacted to give a prepolyester: dimethyl terephthalate (350.55 g), 1,4-butanediol (450.00 g), glycerol (1.21 g), TBOT (1.3 g), sebacic acid (411.73 g). 3.4 g of hexamethylene diisocyanate were then slowly metered into the mixture within a period of 1 h at 240° C.

Polyester Mixture A1B1C1-1

A blend of: 67.8% of polyester A1, 32% of NatureWorks® 4042D PLA (component B1), and 0.2% of Joncryl ADR 4368 CS (component C1).

Polyester Mixture A1B1C1-2

A blend of: 54.7% of polyester A1, 45% of NatureWorks 4042D® PLA (component B1), 0.2% of Joncryl ADR 4368CS (component C1), and 0.1% of erucamide.

Polyester Mixture A2B1C1-3

A blend of: 54.7% of polyester A2, 45% of NatureWorks 4042D® PLA (component B1), 0.2% of Joncryl ADR 4368CS (component C1), and 0.1% of erucamide.

The thickness of all of the films produced was from 20 to 30 μm. If Ecoflex F BX 7011 was used in the external layers

| No. | Thickness [μm] | Extruder 1, layer A (20%) | Extruder 2, layer B (60%) | Extruder 3, layer B (20%) | BUR |
|---|---|---|---|---|---|
| Comp 1 | 30 | A1/Wax | Polyester A1 | A1/Wax | 2:1 |
| 2 | 30 | A1/Wax | A1B1C1-1 | A1/Wax | 2:1 |
| 3 | 30 | A1/Wax | A1B1C1-1 | A1/Wax | 3:1 |
| 4 | 30 | A1/Wax | A1B1C1-1 | A1/Wax | 4:1 |
| 5 | 30 | A1/Wax | A1B1C1-2 | A1/Wax | 2:1 |
| 6 | 30 | A1/Wax | A1B1C1-2 | A1/Wax | 3:1 |
| 7 | 30 | A1/Wax | A1B1C1-2 | A1/Wax | 4:1 |
| 8 | 30 | A1B1C1-1 | A1B1C1-1 | A1B1C1-1 | 2:1 |
| 9 | 30 | A1B1C1-1 | A1B1C1-1 | A1B1C1-1 | 3:1 |
| 10 | 30 | A1B1C1-1 | A1B1C1-1 | A1B1C1-1 | 4:1 |
| 11 | 30 | A1B1C1-2 | A1B1C1-2 | A1B1C1-2 | 2:1 |
| 12 | 30 | A1B1C1-2 | A1B1C1-2 | A1B1C1-2 | 3:1 |
| 13 | 30 | A1B1C1-2 | A1B1C1-2 | A1B1C1-2 | 4:1 |
| 14 | 30 | A2B1C1-3 | A2B1C1-3 | A2B1C1-3 | 2:1 |
| 15 | 30 | A2B1C1-3 | A2B1C1-3 | A2B1C1-3 | 3:1 |
| 16 | 30 | A2B1C1-3 | A2B1C1-3 | A2B1C1-3 | 4:1 |
| 17 | 20 | A2B1C1-3 | A2B1C1-3 | A2B1C1-3 | 3:1 |

3. Shrink Trials

A laboratory shrink system was available for the shrink trials and had a heated shrink tunnel and adjustable regulated temperature of the stream of hot air, and also a sealing unit with two sealing bars and regulated sealing temperature (made by Pentatec, Italy). For the shrink trials, 6×0.5 l PET drinks bottles were wrapped by a piece of film of width about 540 mm and length about 710 mm, and the films were welded at about 120° C. at the front end with the aid of the sealing unit. The packs were then passed through the shrink tunnel on a conveyor belt at constant advance rate. The shrink temperature was set here to about 150-160° C. The residence time of the pack in the shrink tunnel was about 30 sec. At the end of the shrink tunnel, the packs were cooled with the aid of a fan and the film was thus solidified. After the shrink and cooling procedure, all of the shrink packs produced were assessed for shrink result (close contact of film, etc.) and retention forces.

4. Results

4.1 Mechanical Properties of Films

To assess the mechanical properties of the films, all of the films were subjected to a tensile test to ISO 527 and a penetration test to DIN 53373. To assess stiffness/toughness ratio, tensile strength (static stress) and penetration energy (dynamic stress) were studied in more detail and compared with an LDPE film of thickness 50 μm, which represents the current standard for fine-gauge shrink films:

Tensile Strength to ISO 527

| | LDPE film, 50 μm | Comp 1 | 2 | 5 | 8 | 11 | 14 | 17 |
|---|---|---|---|---|---|---|---|---|
| MD | 25 | 39 | 33 | 36 | 38 | 39 | 37 | 38 |
| CD | 24 | 37 | 25 | 24 | 25 | 23 | 23 | 24 |

Penetration Energy to DIN 53373

| LDPE film, 50 μm | Comp 1 | 2 | 5 | 8 | 11 | 14 | 17 |
|---|---|---|---|---|---|---|---|
| 23 | 22 | 23 | 24 | 30 | 34 | 33 | 20 |

As can be seen from the tables, the strength (tensile strength) and toughness properties achieved in shrink films produced in the invention with thickness of only from 20 to 30 μm can be comparable to, or even better than, those of a 50 μm LDPE film. In particular, shrink films with relatively high PLA content achieve a reduction of up to 40% in wall thickness for identical mechanical properties. In particular, shrink films Nos. 11, 14, and 17 should be highlighted here, these having been produced with 45% PLA content.

4.2 Shrink Properties

To assess shrink properties, shrink trials based on DIN 53377 and ISO 11501 were carried out, alongside a purely visual check of the shrink pack. For this, film specimens measuring 100×100 mm were cut out from the films and a longitudinal incision of about 10 mm was made. This incision serves merely for identification of the longitudinal direction for the purposes of subsequent determination of shrinkage. For the shrink test, the film samples were immersed in a hot oil bath (silicone); during this test, the films were held in a grid cage, to allow free unhindered shrinkage. The conditions for the shrink tests were as follows:

Temperature range: from 90 to 150° C.

Progression: in 10° C. steps

Shrink time: 60 s

The change in length divided by the initial length gives shrinkage in the longitudinal (MD) or, respectively, transverse (CD) test direction.

As shown by the table below, the blow-up ratio (BUR) has a decisive effect on the orientation levels introduced and therefore on thermal shrinkage. As the blow-up ratio increases, longitudinal shrinkage decreases and transverse shrinkage increases. The blow-up ratio selected in the film-extrusion process for the polyesters and polyester mixtures studied here should preferably be from 2:1 to 3:1, in order to achieve maximum longitudinal orientation.

TABLE shrink values in [%], longitudinal, hot oil bath, 60° C., 60 sec

| ° C. | 14 BUR 2:1 | 15 BUR 3:1 | 16 BUR 4:1 |
|---|---|---|---|
| 90 | 33 | 27 | 22 |
| 100 | 44 | 39 | 34 |
| 110 | 53 | 47 | 44 |
| 120 | 61 | 60 | 59 |
| 130 | 70 | 68 | 65 |
| 140 | 81 | 70 | 70 |
| 150 | 91 | 85 | 80 |

TABLE shrink values in [%], transverse, hot oil bath, 60° C., 60 sec

| ° C. | 14 BUR 2:1 | 15 BUR 3:1 | 16 BUR 4:1 |
|---|---|---|---|
| 90 | 5 | 13 | 16 |
| 100 | 12 | 20 | 26 |
| 110 | 19 | 30 | 33 |
| 120 | 20 | 39 | 43 |
| 130 | 24 | 43 | 49 |
| 140 | 26 | 45 | 50 |
| 150 | 17 | 40 | 51 |

The shrink behavior values also reveal that the shrinkage values at about 120° C. and at higher temperatures are at similar levels, a fact that can be explained via the high proportion of shrinkage in this temperature range provided by the polyester A1, which is comprised in all of the mixtures. At temperatures below 120° C., shrinkage behavior is significantly affected by the PLA comprised in the formulations. The shrink curves shown below depict the shrinkage behavior of the films produced in the invention in comparison with the standard LDPE film. In particular in a temperature range from 90 to 120° C. the films produced in the invention begin to shrink significantly sooner than the conventional LDPE shrink film. This behavior becomes more pronounced as the PLA content in the respective film formulation increases. The earlier start of shrinkage leads to shrinkage behavior with a significantly wider shrinkage window in comparison with LDPE. The earlier start of shrinkage can moreover be used to set lower shrinkage temperatures on the shrink oven. In the case of the shrink trials carried out here, the temperature could be lowered to about 150° C., whereas temperatures of about 180° C. are usually used for LDPE films. This behavior is discernible particularly with polyester blends based on sebacic acid (A2) (Nos. 14 and 17). The lower melting point of the sebacic-acid-based polyester A2 (melting point measured by means of DSC to ISO 11357-3 being 110° C. for A2 and 118° C. for A1) within the polyester blend leads to high shrinkage values even at low temperatures.

The results of the visual test of the shrink packs, and also of a carry test using transportation straps adhesive-bonded to the packs, were that the packs were not disrupted by normal transport movements and withstood the loads.

Finally, it can be said that the PLA content that should be selected within the polyester blend in order to achieve a balanced ratio of strength properties and toughness properties together with optimized shrink properties is preferably from 30 to 55% by weight, and component A should form the continuous phase. The blow-up ratio during film production should preferably be about 2:1 to 3:1. Variation of blow-up ratio can be used to make adjustment in respect of any longitudinal and transverse deviations that may arise.

TABLE

Shrink values in [%], longitudinal, hot oil bath, 60° C., 60 sec

| °C. | LDPE film 50 μm | Comp 1 | 2 | 5 | 8 | 11 | 14 | 17 |
|---|---|---|---|---|---|---|---|---|
| 90 | 0 | 2 | 1 | 6 | 3 | 9 | 33 | 30 |
| 100 | 0 | 11 | 17 | 25 | 19 | 22 | 44 | 44 |
| 110 | 2 | 40 | 36 | 45 | 42 | 43 | 53 | 55 |
| 120 | 61 | 71 | 61 | 66 | 52 | 56 | 61 | 60 |
| 130 | 77 | 80 | 76 | 78 | 68 | 70 | 70 | 70 |
| 140 | 78 | 87 | 87 | 85 | 88 | 85 | 81 | 80 |
| 150 | 80 | 96 | 96 | 96 | 96 | 95 | 92 | 92 |

TABLE shrink values in [%], transverse, hot oil bath, 60° C., 60 sec

| °C. | LDPE film 50 μm | Comp 1 | 2 | 5 | 8 | 11 | 14 | 17 |
|---|---|---|---|---|---|---|---|---|
| 90 | 1 | −1 | 1 | 0 | 3 | 9 | 33 | 30 |
| 100 | 1 | −5 | −2 | 1 | 19 | 22 | 44 | 44 |
| 110 | 1 | −9 | −3 | 5 | 42 | 43 | 53 | 55 |
| 120 | 9 | −9 | −3 | 9 | 52 | 56 | 61 | 60 |
| 130 | 13 | −10 | −3 | 10 | 68 | 70 | 70 | 70 |
| 140 | 13 | −16 | −8 | 10 | 88 | 85 | 81 | 80 |
| 150 | 17 | −19 | −20 | −10 | 96 | 95 | 92 | 92 |

4.3 Seal Seam Strength

The sealing conditions defined were based on DIN 55529. The sealing temperature was varied from 90 to 150° C. Progression in 10° C. steps. The sealing time was 0.5 sec, with a sealing pressure of 5 bar.

TABLE

Seal seam strength

| Temperature [° C.] | Seal seam strength [N/15 mm] 6 | Seal seam strength [N/15 mm] 12 |
|---|---|---|
| 90 | 8.6 | 4.0 |
| 100 | 10.2 | 5.5 |
| 110 | 13.0 | 9.2 |
| 120 | 17.2 | 12.4 |
| 130 | 18.6 | 13.1 |
| 140 | 19.4 | 13.5 |
| 150 | 20.1 | 14.3 |

The values listed in the table demonstrate that the seal seam strength of shrink film No. 6 with an outer layer made of polyester A1 is higher than that of shrink film No. 12 with an outer layer made of an A1B1C1-2 polyester mixture.

The invention claimed is:

1. A process for producing a shrink film comprising mixing components A), B), and C) to produce a polymer mixture and blown film extruding the polymer mixture while choosing a blow-up ratio from 2:1 to 3:1, wherein
   A) from 45 to 70% by weight of a biodegradable, aliphatic-aromatic polyester obtained via condensation of:
   i) from 40 to 70 mol %, based on components i to ii, of one or more dicarboxylic acid derivatives or dicarboxylic acids selected from the group consisting of: succinic acid, adipic acid, sebacic acid, azelaic acid, and brassylic acid, wherein the dicarboxylic acid derivatives are di-$C_1$-$C_6$-alkyl esters;
   ii) from 60 to 30 mol %, based on components i to ii, of a terephthalic acid di-$C_1$-$C_6$-alkyl ester;
   iii) 98 to 102 mol %, based on components i to ii, of a C2-C8 alkylenediol or C2-C6 oxyalkylenediol;
   iv) from 0.00 to 2% by weight, based on the total weight of components i to iii, of a chain extender and/or crosslinking agent selected from the group consisting of: a di- or polyfunctional isocyanate, isocyanurate, oxazoline, epoxide, and carboxylic anhydride, and/or an at least trihydric alcohol, or an at least tribasic carboxylic acid; and
   B) from 30 to 55% by weight of polylactic acid and
   C) from 0 to 2% by weight of a compatibilizer.

2. The process according to claim 1, where the definitions of components i) and ii) of the polyester A are as follows:
   i) from 52 to 65 mol %, based on components i to ii, of one or more dicarboxylic acid derivatives or dicarboxylic acids selected from the group consisting of: succinic acid, adipic acid, sebacic acid, azelaic acid, and brassylic acid, wherein the dicarboxylic acid derivatives are di-$C_1$-$C_6$-alkyl esters; and
   ii) from 48 to 35 mol %, based on components i to ii, of a terephthalic acid di-$C_1$-$C_6$-alkyl ester.

3. The process according to claim 1, where component i) of the polyester A uses sebacic acid or a mixture of sebacic acid with the other diacids.

4. The process according to claim 1, where the polymer mixture comprises, as compatibilizer C, from 0.05 to 2% by weight of an epoxy-containing poly(meth)acrylate.

5. The process according to claim 1 for producing a fine-gauge shrink film of thickness from 20 to 40 μm.

6. The process according to claim 1 for producing a heavy-gauge shrink film of thickness from 50 to 180 μm.

7. The process according to claim 6 for producing shrink films for books, bottles, containers, and food or drink.

8. The process according to claim 6 for producing shrink films for pallets and container systems.

9. The process according to claim 1, for producing a multilayer shrink film, where the constitution of at least the middle layer is as follows:
   A) from 20 to 70% by weight of a biodegradable, aliphatic-aromatic polyester obtainable via condensation of:
   i) from 40 to 70 mol %, based on components i to ii, of one or more dicarboxylic acid derivatives or dicarboxylic acids selected from the group consisting of: succinic acid, adipic acid, sebacic acid, azelaic acid, and brassylic acid, wherein the dicarboxylic acid derivatives are di-$C_1$-$C_6$-alkyl esters;
   ii) from 60 to 30 mol %, based on components i to ii, of a terephthalic acid di-$C_1$-$C_6$-alkyl ester;
   iii) from 98 to 102 mol %, based on components i to ii, of a $C_2$-$C_8$ alkylenediol or $C_2$-$C_6$ oxyalkylenediol;
   iv) from 0.00 to 2% by weight, based on the total weight of components i to iii, of a chain extender and/or crosslinking agent is a di- or polyfunctional isocyanate, isocyanurate, oxazoline, epoxide, and carboxylic anhydride, and/or an at least trihydric alcohol, or an at least tribasic carboxylic acid;
   iv) from 0.00 to 50% by weight, based on the total weight of components i to iv, of at least one organic filler selected from the group consisting of:
   native or plastified starch,
   natural fibers,
   wood flour, and
   an inorganic filler selected from the group consisting of: chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, glass fibers, and mineral fibers, and vi) from 0.00 to 2% by weight, based on the total weight of components i to iv, of at least one stabilizer, nucleating agent, lubricant and release agent, surfactant, wax, antistatic agent, antifogging agent, dye, pigment, UV absorber, UV stabilizer, or other plastics additive;

and

B) from 30 to 80% by weight of one or more polymers selected from the group consisting of: polylactic acid, polyalkylene carbonate, polycaprolactone, polyhydroxyalkanoate, chitosan, gluten, and one or more aliphatic polyesters;

and

C) from 0 to 2% by weight of a compatibilizer.

10. The process according to claim 9, wherein B) is from 30 to 80% by weight of one or more polymers selected from the group consisting of:

polylactic acid,
polyalkylene carbonate,
polycaprolactone,
polyhydroxyalkanoate,
chitosan,
gluten, and
one or more polybutylene succinate, polybutylene adipate, polybutylene sebacate, polybutylene succinate adipate, or polybutylene succinate sebacate.

11. The process according to claim 1, wherein the film is produced in an extruder.

* * * * *